United States Patent [19]
Rose et al.

[11] Patent Number: 5,817,585
[45] Date of Patent: Oct. 6, 1998

[54] PAINT AND STAIN REMOVER IN AN ABRASIVE APPLICATOR FOR HARD SURFACES

[75] Inventors: Edward S. Rose, Leawood, Kans.; Raymond G. Wile, Liberty, Mo.

[73] Assignee: Dymon, Inc., Olathe, Kans.

[21] Appl. No.: 718,826

[22] Filed: Sep. 24, 1996

[51] Int. Cl.$^6$ ........................................................ B32B 5/16
[52] U.S. Cl. ........................ 442/417; 428/305.5; 51/295; 510/407
[58] Field of Search ........................ 442/417; 428/305.5; 51/295; 252/162, 170; 510/407

[56] References Cited

U.S. PATENT DOCUMENTS

| | | |
|---|---|---|
| Re. 31,885 | 5/1985 | Meitner . |
| 3,277,013 | 10/1966 | Gianladis . |
| 3,619,251 | 11/1971 | Stiles, Sr. . |
| 4,133,921 | 1/1979 | Palcher . |
| 4,336,151 | 6/1982 | Like et al. . |
| 4,364,746 | 12/1982 | Bitzer et al. . |
| 4,448,704 | 5/1984 | Barby et al. . |
| 4,659,609 | 4/1987 | Lamers et al. ........................ 428/194 |
| 4,666,621 | 5/1987 | Clark et al. . |
| 4,683,001 | 7/1987 | Floyd et al. ........................ 106/3 |
| 4,753,844 | 6/1988 | Jones et al. . |
| 4,775,582 | 10/1988 | Abba et al. . |
| 4,784,786 | 11/1988 | Smith et al. . |
| 4,833,003 | 5/1989 | Win et al. . |
| 4,853,281 | 8/1989 | Win et al. . |
| 4,927,556 | 5/1990 | Pokorny . |
| 4,931,201 | 6/1990 | Julemont . |
| 4,963,432 | 10/1990 | Fuggini et al. ........................ 428/290 |
| 4,974,763 | 12/1990 | Widrig . |
| 5,094,770 | 3/1992 | Sheridan et al. . |
| 5,234,719 | 8/1993 | Richter et al. . |

FOREIGN PATENT DOCUMENTS

| | | |
|---|---|---|
| 0068722 | 5/1983 | European Pat. Off. . |
| 0256950 | 2/1988 | European Pat. Off. . |
| 0573277 | 8/1993 | European Pat. Off. . |
| 0 615 720 A1 | 9/1994 | European Pat. Off. . |
| 2438078 | 4/1980 | France . |
| 0842866 | 7/1960 | United Kingdom . |
| 2179052 | 2/1987 | United Kingdom . |
| 2267681 | 12/1993 | United Kingdom . |

OTHER PUBLICATIONS

Coleman, D. Limonene As A Degreasing Agent, The Citrus Industry, Nov., 1975, vol. 56, pp. 23–25.

*Primary Examiner*—Marion E. McCamish
*Assistant Examiner*—Cheryl Juska
*Attorney, Agent, or Firm*—Shook, Hardy & Bacon L.L.P.

[57] ABSTRACT

A paint and stain remover article comprises a substrate capable of absorbing and retaining a fluid with two opposed surfaces wherein at least one surface is abrasive, and a nonabrasive liquid formulation for removing paint, stains and other marks absorbed in the substrate, the liquid formulation comprising an aliphatic solvent, a terpene, a glycol ether or dibasic ester, and a ketone or acetate, whereby initial removal action is achieved by the liquid formulation, and final removal action is achieved by the abrasive surface of the substrate and by the absorption of the dissolved marking residue into the substrate. The substrate can comprise a cloth-like towel. A plurality of such towels is provided in a continuous rolled cylinder which is a selectively sealable, essentially airtight container. An opening in the lid of the container allows the user to remove individual towels which contain the appropriate amount of liquid formulation thereon.

6 Claims, No Drawings

PAINT AND STAIN REMOVER IN AN ABRASIVE APPLICATOR FOR HARD SURFACES

BACKGROUND OF THE INVENTION

This invention relates to paint and stain removers, and, more particularly, to a cleaner which is able to remove a variety of marks such as paint, ink, magic marker, crayon or stains from surfaces which are at least somewhat non-porous.

Cleaners for removing marks in the prior art generally consist of solvents, water, and/or surfactants. In applying these cleaners of the prior art, the user typically needed to first select a cleaner and an application tool for the cleaner, such as a cloth or sprayer. Once the cleaner formulation was applied, the partially dissolved marking was agitated with a removal tool such as a brush and then removed with a dry cloth or a water rinse.

The cleaners of the prior art are not capable of evenly cleaning a surface because varying amounts of such cleaners are applied to different sections of the surface. This is problematic because the application of an excessive amount often damages the substrate being cleaned, while the application of an insufficient amount yields insufficient wetting of the markings, thus giving poor removal results.

In addition, when applying cleaners of the prior art, the marking typically cannot be treated in isolation. Instead, the marking is softened and allowed to partially dissolve thus causing it to run onto clean surfaces. Another disadvantage of the prior art is that its application tools allow solvents to be released indiscriminately into the atmosphere in excessive amounts. This results in unwanted volatile organics in the atmosphere which pollute the air and cause ozone depletion. The systems of the prior art also cause pollution as water typically is used as a rinse for the cleaner, and is then disposed of into sewers, ponds, or lakes despite the fact that it contains solvents.

There is, therefore, a need in the industry to provide a cleaner for removing marks which can be applied to a surface in a single step using a single tool for applying, rubbing, and removing. In addition, there is also a need to apply the cleaner without the adverse environmental impact of the prior art.

SUMMARY OF THE INVENTION

It is, therefore, an object of this invention to provide a paint and stain remover article which comprises a one step cleaning system that combines a liquid cleaner for removing marks with an absorbent abrasive so that embedded soils or contaminants can be removed.

It is a further object of this invention to provide a paint and stain remover article which enables a cleaner to be evenly applied to a treated surface so that markings can be removed properly without damaging the substrate.

Another object of this invention is to provide a paint and stain remover which is capable of achieving isolated treatment of a marking so as not to allow the softened marking residue to run onto a clean surface and also to absorb the removed residue within the substrate without redepositing it on other surfaces.

Yet another object of this invention is to provide a paint and stain remover which can protect the environment by greatly reducing the excessive release of volatile organics into the air and by preventing pollution caused by the disposal of water rinses into sewers, lakes, and ponds. The combination towel and liquid formulation greatly reduces excess volatile organics from entering the atmosphere because the used towel containing the removed residue can be safely transported for proper disposal following an environmentally controlled disposal method.

It is also an object of the invention to provide a paint and stain remover which incorporates an abrasive substrate or towel to hold the cleaners and aid in the removal of unwanted markings through a scrubbing action.

Accordingly, the paint and stain remover article of the present invention provides a cleaner and polish formulation impregnated in an abrasive substrate and one step method for removing paint, stains and other markings. The article is comprised of a substrate which has at least one abrasive surface and a liquid formulation comprised of an aliphatic solvent, a terpene, a glycol ether, dibasic ester, and a ketone or acetate. The liquid formulation is absorbed and retained by the substrate. Specifically, the initial removal action is achieved by the liquid formulation penetrating into the unwanted marking, and the final removal action is achieved by the abrasive surface of the substrate, and by the absorption of the dissolved marking residue into the substrate.

The article further comprises a plurality of towels provided in a continuous rolled cylinder housed in a sealed container, and a lid associated with the container and having an opening for receiving the towels therethrough.

This paint and stain remover article is useful in cleaning surfaces by removing unwanted markings. This article is particularly useful in removing marks from metal, glass, wood, certain plastics, vinyl, leather, and acrylic. Some specific applications of this invention include, but are not limited to, removing marks from aluminum siding, phone booths, painted surfaces, tabletops, Plexiglas, upholstery, buses, subways, trains, lockers, signs, vehicles, billboards, hallways, elevators, fences, corridors, restrooms, and appliances.

DESCRIPTION OF THE PREFERRED EMBODIMENT(S)

A paint and stain remover towel article is provided comprising an abrasive substrate and a liquid paint and stain remover formulation incorporated thereon. The abrasive substrate of the preferred embodiment comprises a cloth-like towel having at least one abrasive surface. The abrasive surface can be formed in several different manners from a number of different materials. According to one embodiment of this invention, the towel can be similar to that described in U.S. Pat. No. 4,833,003 to Kimberly-Clark entitled "Uniformly Moist Abrasive Wipes," issued May 23, 1989, which is herein incorporated by reference in its entirety. The towel encompassed within the scope of this invention has two opposed surfaces. An abrasive component is permanently attached to or an integral part of at least one surface of the towel, although it is possible for the abrasive component to be present on both surfaces. The abrasive component may comprise a layer of fibers and/or globules bonded to the surface of a substrate, such as a layer of fibers or fiber bundles and small, minute generally spherical masses having a wide range of acceptable diameters, namely from about 40 microns to about 200 microns. Due to the irregular nature of such fibers and globules, it is recognized that the diameter is approximate, as such fibers and globules typically are not perfectly round. These fibers/globules can be formed from polymeric materials by known means, such as by meltblowing a polymer melt. It is not necessary to incorporate a combination of fibers and globules, as it is possible to utilize either component by itself as the abrasive. Alternatively, the abrasive component may comprise any of a number of known particulates which can function as an abrasive when bonded onto a substrate.

The term "abrasive" as used herein refers to an abrasive ingredient which comprises a surface texture that enables the towel to produce a mild scouring or abrading action to effectively remove dirt or other contaminates which are embedded in a surface to be cleaned and polished, such as leather or vinyl, while not harming such surface by scratching or the like. The degree of abrasiveness can vary widely, depending primarily upon the abrasive component on the substrate and the degree of texture which is formed by such abrasive component. Typically the abrasive surface is somewhat coarse and roughened as compared to a smooth surface of the towel. In accordance with a preferred embodiment of this invention, the preferred abrasive towel is adequately mildly abrasive so as to avoid scratching the surface intended to be cleaned by the towel, while having sufficient abrading qualities to effectively remove embedded dirt and contaminants from the object being cleaned. Although the abrasive properties are very mild in the sense of not cutting or scouring the object being cleaned, the texture is relatively high so as to accomplish removal of dirt and other contaminants from the object being cleaned.

To be optimally effective, the abrasive component of this invention accounts for a minimum of 10% and a maximum of 90% of the surface area of the abrasive side of the towel, with the opposite side having a smooth surface for wiping and buffing. It is anticipated that both sides of the towel can have abrasive ingredients incorporated thereon and that the percentage of abrasive component on each side can differ as desired.

In addition, the towel must be capable of absorbing and retaining a predetermined amount of fluid, such as the liquid paint and stain remover formulation contemplated by the preferred embodiment, sufficient to provide a uniformly moist towel. The absorbent character of the towel encompassed herein is achieved by a system of voids or pores which absorb and tightly retain the liquid formulation, such as by capillary action. The towel should also be capable of readily releasing the liquid during use. The specific void or pore volume of the towel structure regulates the amount of fluid which can be retained in the towel. In one embodiment, the towel is composed of a non-woven polypropylene that absorbs the softened soils to achieve a clean surface for removing all marking residue.

The composition of the paint and stain remover formulation embodied in this invention generally comprises four or more solvents, including aliphatic solvents, terpenes, glycol ethers or dibasic esters, and acetates or ketones. Optionally, additional solvents and odorants can also be incorporated into the formulation.

In a preferred embodiment, the paint and stain formulation of the present invention is comprised of the following, with both the preferred and the acceptable ranges of ingredients being indicated:

| Ingredients | Preferred % By Weight | Range of % |
|---|---|---|
| Aliphatic Solvents | 19.50 | 10.00–30.00 |
| Terpenes | 10.00 | 5.00–20.00 |
| Glycol ethers or Dibasic esters | 50.00 | 25.00–70.00 |
| Ketones or Acetates | 20.00 | 15.00–50.00 |
| Odorant | 0.50 | 0.00–2.00 |

The aliphatic solvents contemplated for use in the formulation of this invention are included to retard the rate at which the formulation evaporates, and further to reduce the solvency of the formulation. Further, the aliphatic solvents function as effective grease removers, particularly with respect to petroleum based contaminants, and are relatively safe from a toxicity standpoint. Preferably, this solvent has an evaporation rate of 0.15 or less, in comparison to toluene which has an evaporation speed of 1.0. Most preferably, this ingredient is an odorless mineral spirit.

The terpenes are particularly useful in the formulation of this invention as solvents for inks and paints, as well as effective grease removers. They are also desirable for improving the odor of the formulation. Preferably, d-Limonene is used as the terpene in this formulation.

Glycol ethers are used in this formulation because they are excellent solvents for inks, resins and paint polymers. Any glycol ether may be used in this formulation, with the preferred glycol ethers being Glycol Ether EB (ethylene glycol monobutyl ether) and Glycol Ether PM (propylene glycol monomethyl ether). In addition, any dibasic ester may be used in place of the glycol ether. In a preferred embodiment, the overall glycol formulation is 30% by weight ethylene glycol monobutyl ether and 20% by weight propylene glycol monomethyl ether.

Ketones and acetates are able to quickly penetrate into paint polymers and resins. Thus, use of a ketone or acetate in the formulation is helpful in initially decomposing and dissolving paint, stains, and residue films. Examples of ingredients which are suitable for performing this function within the formulation of this invention include but are not limited to ethyl acetate, propyl acetate, butyl acetate, methyl ethyl ketone, methyl isobutyl ketone, and acetone.

Although the odorant is not a necessary component of this formula, it is a desirable component of the preferred embodiment. Preferably, the odorant is a perfume.

The following are examples of paint and stain remover formulations according to this invention. These examples are not meant in any way to limit the scope of this invention.

EXAMPLE 1

General Purpose Paint and Stain Remover Formulation

| Ingredients | % by Weight |
|---|---|
| Odorless Mineral Spirits | 19.50 |
| d-Limonene | 10.00 |
| Propylene glycol monomethyl ether | 20.00 |
| Ethylene glycol monobutyl ether | 30.00 |
| Ethyl Acetate | 20.00 |
| Fragrance | 0.50 |

EXAMPLE 2
Paint Remover Formulation for Thick Paint Coatings

| Ingredients | % by Weight |
| --- | --- |
| Aliphatic Solvent | 10.00 |
| d-Limonene | 15.00 |
| Glycol ether | 25.00 |
| Ethyl Acetate | 50.00 |

EXAMPLE 3
Long-Lasting Touch-Up Remover Formulation

| Ingredients | % by Weight |
| --- | --- |
| Odorless Mineral Spirits | 30.00 |
| Terpene | 5.00 |
| Glycol Ether | 35.00 |
| Dibasic Ester | 13.00 |
| Acetone | 15.00 |
| Fragrance | 2.00 |

EXAMPLE 4
Ink-Remover Formulation

| Ingredients | % by Weight |
| --- | --- |
| Aliphatic Solvent | 15.00 |
| d-Limonene | 20.00 |
| Propylene Glycol Monomethyl ether | 20.00 |
| Ethylene Glycol Monobutyl ether | 20.00 |
| Methyl ethyl ketone | 5.00 |
| Ethyl acetate | 5.00 |
| Acetone | 15.00 |

EXAMPLE 5
Extra Absorbative Formulation

| Ingredients | % by Weight |
| --- | --- |
| Odorless Mineral Spirits | 10.00 |
| Terpene | 5.00 |
| Glycol Ether | 69.00 |
| Ethyl Acetate | 15.00 |
| Fragrance | 1.00 |

The liquid paint and stain remover formulation which is incorporated into the towel is primarily a solvent formulation capable of removing a variety of markings and stains from somewhat non-porous surfaces. This liquid formulation has a viscosity sufficient for being easily absorbed into the pores or voids of the towel through capillary action. The solvents are preferably capable of solubilizing air dry latex paints, oil based paints and inks. The preferred solvents can be a mixture of aliphatic solvents, dibasic esters, terpenes, glycol ethers, alcohols, polyols, alcohol-amines, aromatic s, chlorinated ketones, acetates, and furfuryls.

In preparing the paint and stain remover towel article of a preferred embodiment, a plurality of abrasive towels are provided, preferably in a continuous, perforated, roll of towels. The line of perforation presents a line of weakness by which said towels can be easily separated. Said towels are inserted on-end into a selectively resealable, preferably cylindrical container, with the axis of the cylinder being aligned in an essentially vertical orientation. Of course, it is anticipated that an alternative preferred embodiment of this invention could provide a stack of individual towels instead of the continuous roll of towels. The paint and stain remover formulation is then added to the container, preferably by pouring the same over the roll of towels, thereby saturating the towels with the formulation within the container. The capillary action associated with the void volume of the towel as discussed above causes the paint and stain formulation to be distributed evenly throughout the roll of towels.

An example of a suitable container for holding the towels comprises an essentially airtight lid on the top portion thereof which can be selectively sealed, said lid comprising a hinged cap having an opening positioned thereunder. This opening allows for the passage of towels from the interior of the sealed container via the opening, whereby individual towels can be removed by pulling the towel and tearing the same off of the roll at the perforated line located between each individual towel. The opening is appropriately sized to provide means for removing excess liquid from each individual towel as it is removed from the container.

In use, an individual towel is removed from the container a s described above. When properly prepared, the towel contains an amount of the liquid remover formula sufficient to thoroughly remove markings such as paints or inks from surfaces. As the towel is rubbed on the marked surface, it releases the liquid remover formulation and allows it to have extended contact time with the contaminants. It also provides for continuous removal action without the need to apply additional removal liquid. The abrasive character of the towel facilitates removal of embedded soils without leaving any abrasive residue on the cleaned surface, which residue would otherwise necessitate rinsing the surface with water after the cleansing process to thoroughly remove the abrasive residue. Further, the nature of the article facilitates removal of the dissolved paint residue without the need for rinsing or additional towels or other tools. In one embodiment, the towel is comprised of a non-woven polypropylene that absorbs the softened marking residue to achieve a clean surface. Thus, an article for removing marks such as paint, stains, magic marker, crayon and ink is provided without the negative features associated with stain removers and paint cleaners in the prior art.

The paint and stain remover article of the present invention also assures efficient use of the paint and stain remover formulation, since the proper amount of cleanser is provided for each individual use. Other low viscosity liquid cleansers tend to be wasted as the low viscosity associated with such cleansers often causes them to run off of the contaminated area onto a clean area thus causing additional cleaning. Gelatinous cleansers are also difficult to use efficiently. The user may use too little, necessitating a repeated application, or too much, requiring a cloth or towel to remove the wasted excess.

Furthermore, the towel of the present invention acts as a substrate for the formulation and as a vehicle for the abrasive ingredient, and it also works to dry the cleaned surface after the liquid formulation in the towel has been applied to a surface and has partially evaporated from the towel and to remove dissolved residue of the markings being removed.

This product is useful for removing paint and stains. Examples of surfaces where this product is used include but are not limited to aluminum siding, glass, phone booths, painted surfaces, tabletops, Plexiglas, certain plastics, vinyl, upholstery, buses, subways, trains, lockers, signs, stainless steel, vehicles, billboards, hallways, elevators, fences, corridors, restrooms, and appliances.

From the foregoing, it will be seen that this invention is one well adapted to attain all the ends and objects herein-above set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A paint and stain remover article, comprising:
   a substrate capable of absorbing and retaining a fluid therein, having two opposed surfaces wherein at least one surface is abrasive; and
   a liquid formulation for removing paint, stains and other marks which is absorbed in the substrate, whereby the initial removal action is achieved by said liquid formulation and the final removal action is achieved by the abrasive surface of said substrate;
   wherein said liquid formulation comprises:
      a terpene;
      an aliphatic solvent;
      a glycol ether or dibasic ester; and
      a ketone or acetate.

2. A paint and stain remover article as set forth in claim 1, wherein the terpene is d-Limonene and the aliphatic solvent is an odorless mineral spirit.

3. A paint and stain remover article as set forth in claim 1, further comprising:
   additional solvents.

4. A paint and stain remover article as set forth in claim 1, comprising:
   10–30% aliphatic solvent;
   5–20% terpene;
   25–70% glycol ethers or dibasic esters; and
   15–50% ketones or acetate.

5. A paint and stain remover article as set forth in claim 1, comprising:
   15–25% aliphatic solvent;
   7–15% terpene;
   35–60% glycol ethers or dibasic esters; and
   15–30% ketones or acetate.

6. A paint and stain remover article as set forth in claim 1, further comprising:
   an odorant.

* * * * *